3,018,207
ADHERING TEXTILE MATERIALS TO RUBBER
Arthur C. Danielson, Royal Oak, Mich., assignor to United States Rubber Company, New York, N.Y., a corporation of New Jersey
No Drawing. Filed July 1, 1960, Ser. No. 40,190
13 Claims. (Cl. 154—52)

This invention relates to improvements in the method of adhering textile materials to rubber, and to the improved laminates so obtained.

In certain rubber articles designed to withstand considerable stresses in use, the rubber is reinforced with plies of comparatively inextensible textile materials. Thus, rubber hose, belts and tires are commonly reinforced with filamentary textiles in the form of yarns, cords or fabric. In such articles, it is important that the plies of textile reinforcing material be firmly adhered to the rubber intermediate the textile plies and remain effectively adhered even after the article has been subjected to repeated varying strains in use, because any separation and relative movement of the rubber and textile parts leads to abrasion between these parts and consequent early failure.

According to the present invention, there is provided an improved method for adhering textile material to rubber, for example in adhering the plies of tire cord fabric to the tire carcass stock.

In carrying out the present invention, adhesion of the textile material to the adjacent rubber layer is greatly improved by the use of a resin reaction product of trimeric methyleneaminoacetonitrile and resorcinol, or other meta disubstituted benzene in which each of the substituents is an OH, $NH_2$ or $OCOCH_3$ radical, or 1,5-naphthalenediol. The rubber intermediate the textile plies may be applied in the usual manner by calendering a coating of a vulcanizable rubber composition on the textile material, generally on both sides, e.g. as in the conventional coating of tire cord fabric with tire carcass stock. The textile material, such as tire cord fabric, may optionally previously have applied thereto a thin coating of rubber by passing the textile material through a bath of an aqueous dispersion of rubber, such as rubber latex, and drying. This so-called "solutioning" treatment is common practice. One or both components of the resin adhesive, e.g. the trimeric methyleneaminoacetonitrile and resorcinol, may be applied directly to the textile fabric, or may be compounded in the calendered rubber stock, or may be incorporated in the latex treating bath, provided of course, both components are present in the rubber coated fabric so that they may react to form an in situ resin adjacent the interface of the textile fabric and rubber lamination on heating as in the vulcanization of the rubber. The preferred method is to mix both components of the resin with the compounding ingredients in the solid rubber to be calendered on the textile material. This does not appreciably change the scorch life of the rubber compound, which is an important consideration. The rubber compound may then be calendered onto the bare or latex treated textile material. The amount of the resin components mixed with the rubber is not critical. Generally, 0.5 to 8 parts, and preferably 1 to 4 parts of the two resin-forming components (total) per 100 parts of the rubber will be mixed in the rubber compound to be calendered on the textile material. After building the rubber-coated textile material into the finished article, e.g. a tire, the assembly is heated to vulcanize the rubber components thereof. The adhesion of the textile material to the adjacent vulcanized rubber stock is greatly improved by means of the resin formed at the vulcanizing temperature by the reaction of the trimeric methyleneaminoacetonitrile and resorcinol adjacent the interface of the textile material and the rubber of the laminate.

The trimeric methyleneaminoacetonitrile ($C_9H_{12}N_6$) is known. It is prepared by the reaction of sodium cyanide and formaldehyde and ammonium chloride as described in Organic Syntheses, Collective Vol. I, 2nd edition, pages 355–357, published by John Wiley and Sons, New York, 1941. It has a melting point of 129° C.

The ratio of the two components of the resin are not critical and generally will be from 1 to 4 moles, preferably about 2 moles, of the resorcinol or the other meta disubstituted benzene or the 1,5-naphthalenediol to 1 mole of the trimeric methyleneaminoacetonitrile ($C_9H_{12}N_6$). Example of such other meta disubstituted benzenes in which the substituents are OH, $NH_2$ or $OCOCH_3$ are m-phenylenediamine, m-aminophenol, resorcinol monoacetate, resorcinol diacetate. Instead of straight resorcinol, the source of the resorcinol may be a partially reacted resorcinal-formaldehyde resin. The rubber used in the present invention for making the rubber and fabric laminates for use in tire manufacture and for other purposes may be natural (Hevea) rubber or conjugated diolefine polymer synthetic rubber or mixtures of any of them including their reclaims. Such conjugated diolefine polymer synthetic rubbers are polymers of butadienes-1,3, e.g. butadiene-1,3, isoprene, 2,3,-dimethyl-butadiene-1,3, and mixtures thereof and polymers of mixtures of such butadienes-1,3 with up to 50% of such mixtures of compounds which contain a $CH_2{=}C{<}$ group and which are copolymerizable with butadienes-1,3, e.g. where at least one of the disconnected valences is attached to an electronegative radical, that is a radical which increases the polar character of the molecule, such as vinyl, phenyl, nitrile, carboxy radicals. Examples of such conjugated diolefine polymer synthetic rubbers are polybutadiene, polyisoprene, butadiene-styrene copolymers (SBR) and butadiene-acrylonitrile copolymers. The rubber will also contain conventional compounding and vulcanizing ingredients such as carbon black, rubber processing or softening oils which may be added as such or may be present from oil-extended rubbers, antioxidants, sulfur, zinc oxide and accelerators. The textile material may be any of the conventional textiles used for reinforcing rubber, such as native cellulose (e.g. cottons), regenerated cellulose (e.g. rayons), and synthetic linear polyamides (e.g. nylons), and may comprise cords or woven fabrics.

The following examples illustrate the invention. All parts referred to herein are by weight.

*Example 1*

A rubber compound A was prepared by milling 1.25 parts of resorcinol into a masterbatch of 100 parts of natural rubber and 20 parts of carbon black at about 110° C. After cooling, the following ingredients were mixed into the batch at about 70° C. in the following order: 10 parts of zinc oxide, 2 parts of stearic acid, 0.5 part of accelerator SNS (N-tertiary-butyl-2-benzothiazole-sulfenamide), 1 part of antioxidant BLE (condensation product of acetone and diphenylamine), 1 part of trimeric methyleneaminoacetonitrile, and 3.5 parts of sulfur.

A rubber compound B was prepared in a similar manner to A except the resorcinol and trimeric methyleneaminoacetonitrile were omitted.

A rubber compound C was prepared by milling 1.8 parts of resorcinol into a mixture of 70 parts of oil extended SBR (containing 20 parts of oil) and 50 parts of natural rubber and 50 parts of carbon black at 110° C. After cooling, the following ingredients were mixed into the batch at about 70° C. in the following order: 100 parts of reclaimed natural rubber, 2 parts of stearic acid, 5 parts of zinc oxide, 1 part of BLE, 1 part of accelerator MBTS (benzothiazyl disulfide), 0.1 part of activator DPG (diphenylguanidine), 1.5 parts of trimeric methyleneaminoacetonitrile, and 4 parts of sulfur.

A rubber compound D was prepared in a similar manner to C except the resorcinol and trimeric methyleneaminoacetonitrile were omitted.

A rubber compound E was prepared by milling 1.5 parts of resorcinol in a mixture of 70 parts of oil extended SBR (containing 17.5 parts of oil) and 50 parts of natural rubber and 50 parts of carbon black at 110° C. After cooling, the following ingredients were mixed into the batch at about 70° C. in the following order: 1.5 parts of stearic acid, 25 parts of reclaimed natural rubber, 10 parts zinc oxide, 1 part of BLE, 5 parts of pine tar softener, 1 part of MBTS, 0.1 part of DPG, 1.2 parts of trimeric methyleneaminoacetonitrile, and 3.2 parts of sulfur.

A rubber compound F was prepared in a similar manner to E except the resorcinol and trimeric methyleneaminoacetonitrile were omitted.

Rubber compounds B, D and F are conventional tire carcass stock formulations.

The adhesion of the rubber compounds A to F to tire cords made of bare (grey) and solutioned rayon and nylon fibres was measured at 250° F. by the "H" adhesion test described in Ind. Rub. World, vol. 114, page 213 (1946), "Study of the 'H' test for Evaluating the Adhesive Properties of Tire Cord in Natural and GR–S Rubbers," and in United States Department of Agriculture, Bulletin A1C–99 (1945), by Lyons, Nelson and Conrad. The solutioned rayon and nylon cords in this and the other examples were passed through a conventional latex and resin adhesive bath, so-called "solutioning" bath, and dried. The bath used on rayon cords comprised 80 parts of butadiene-styrene (GR–S) latex solids, 20 parts of butadiene-vinyl pyridine copolymer rubber latex solids, 8 parts of partially reacted resorcinol-formaldehyde resin, 0.5 part of ammonia and 2 parts of formaldehyde at a 15–20% concentration. The bath used on nylon cords comprised 100 parts of butadiene-vinyl pyridine copolymer rubber latex, 15 parts of partially reacted resorcinol-formaldehyde resin, 0.9 part of ammonia and 4.25 parts of formaldehyde at a 15–20% concentration. These are conventional so-called latex cord dipping compounds. In the "H" test, the cord under test coated with the rubber compound under test is embedded in two separated standard rubber blocks and the assembly vulcanized. The pounds necessary to pull the adhered cord free of one of the rubber blocks is the "H" adhesion value. The higher the figure, the better the adhesion of the rubber coating to the cord. Test pieces for the rubber compounds A to F were vulcanized for 45 minutes at 293° F. and also for 30 minutes at 307° F. The results are shown in the following table:

[250° F. "H" adhesion (lbs.)]

|  | A | B | C | D | E | F |
|---|---|---|---|---|---|---|
| Grey (45' at 293° F.) | 8.5 | 3.3 | 6.3 | 2.3 | 9.2 | 2.4 |
| Rayon (30' at 307° F.) | 10.4 | 3.4 | 5.5 | 2.4 | 11.1 | 2.6 |
| Grey (45' at 293° F.) | 9.2 | 3.6 | 4.0 | 2.4 | 9.8 | 2.4 |
| Nylon (30' at 307° F.) | 13.2 | 3.7 | 4.7 | 2.3 | 12.2 | 2.9 |
| Solutioned (45' at 293° F.) | 16.2 | 11.3 | 16.6 | 14.7 | 18.6 | 14.2 |
| Rayon (30' at 307° F.) | 19.2 | 14.7 | 17.2 | 14.2 | 20.9 | 17.4 |
| Solutioned (45' at 293° F.) | 16.3 | 10.7 | 14.1 | 12.2 | 18.3 | 13.2 |
| Nylon (30' at 307° F.) | 17.2 | 12.5 | 13.2 | 12.0 | 18.7 | 16.5 |

Comparing the "H" adhesion values of compounds A with B, C with D, and E with F clearly shows the great improvement in adhesion of fibrous material to rubber by the present invention.

*Example 2*

This example illustrates various ways in which the resorcinol and trimeric methyleneaminoacetonitrile may be incorporated in the vulcanizable rubber composition.

A rubber compound G was prepared by mixing in the following order 100 parts of natural rubber, 33 parts of carbon black, 10 parts of zinc oxide, 2 parts of stearic acid, 1.5 parts of BLE, 0.4 part of SNS, and 3.5 parts of sulfur.

A rubber compound H was prepared similarly to stock G except that 2 parts of a 1:1 finely ground mixture of resorcinol and trimeric methyleneaminoacetonitrile was mixed in before the sulfur.

A rubber compound I was prepared similarly to stock G except a mixture of 1 part of resorcinol and 1 part of trimeric methyleneaminoacetonitrile that had been heated on a steam bath to form a melt and then cooled was mixed in before the sulfur.

A rubber compound J was prepared similarly to stock G except a mixture of 1 part of resorcinol and 1 part of trimeric methyleneaminoacetonitrile that had been heated on a steam bath until a red orange color developed and then cooled was mixed in before the sulfur. The reaction should not go to completion giving a resin not capable of being incorporated in the rubber.

The adhesion of rubber compounds G to J to tire cords made of grey rayon and nylon was measured at 250° F. by the "H" adhesion test. The test pieces were vulcanized for 20 minutes at 320° F. The results are shown in the following table:

[250° F. "H" adhesion (lbs.)]

|  | G | H | I | J |
|---|---|---|---|---|
| Grey Rayon | 1.9 | 6.2 | 7.4 | 6.3 |
| Grey Nylon | 3 | 6.9 | 7.6 | 7.8 |

*Example 3*

This example shows various ratios and amounts of the resorcinol and the trimeric methyleneaminoacetonitrile.

Rubber compounds K, L, M, N, O, P, Q, R, and S were similar to compound E except compound K contained no resorcinol or trimeric methyleneaminoacetonitrile, and compounds L, M, N, O, P, Q, R and S contained 0.5, 1.0, 1.5, 2.0, 0.5, 1.0, 0.83 and 1.67 percent of resorcinol and 0.5, 1.0, 1.5, 2.0, 1.0, 0.5, 1.67 and 0.83 percent of trimeric methyleneaminoacetonitrile, respectively, giving molar ratios of resorcinol to trimeric methyleneaminoacetonitrile of about 2:1, 2:1, 2:1, 2:1, 1:1, 4:1, 1:1, and 4:1, respectively.

The adhesion of rubber compounds K to S to tire cords made of grey and solutioned rayon and nylon was measured at 250° F. by the "H" adhesion test. The test pieces were vulcanized for 30 minutes at 307° F. The results are shown in the following table:

[250° F. "H" adhesion (lbs.)]

|  | K | L | M | N | O | P | Q | R | S |
|---|---|---|---|---|---|---|---|---|---|
| Grey Rayon | 2.3 | 8.1 | 13.0 | 13.2 | 14.0 | 7.6 | 6.3 | 9.3 | 6.7 |
| Grey Nylon | 2.5 | 7.3 | 11.6 | 14.1 | 13.6 | 6.8 | 7.1 | 11.4 | 9.1 |
| Solutioned Rayon | 14.8 | 16.5 | 18.2 | 18.2 | 17.0 | 17.4 | 17.3 | 17.1 | 17.6 |
| Solutioned Nylon | 15.5 | 17.5 | 17.6 | 16.7 | 17.5 | 18.0 | 19.8 | 17.8 | 18.0 |

*Example 4*

This example illustrates the improvement in the adhesion of textile materials to different rubbers by the use of the resin of the present invention.

A rubber compound T was prepared by mixing 50 parts of natural rubber, 50 parts of cis-1,4-polyisoprene rubber, 33 parts of carbon black, 2.5 parts of stearic acid, 10 parts of zinc oxide, 5 parts of pine tar softener, 1.5 parts of BLE, 0.5 part of SNS, and 3.5 parts of sulfur.

A rubber compound U was prepared similarly to compound T except that a mixture of 1 part of resorcinol and 1 part of trimeric methyleneaminoacetonitrile was added before the sulfur.

A rubber compound V was prepared by mixing 100 parts of cis-1,4-polybutadiene rubber, 45 parts of carbon black, 3 parts of stearic acid, 5 parts of hydrogenated rosin, 10 parts of zinc oxide, 2.7 parts of pine tar softener, 1 part of BLE, 0.3 part of antioxidant JZF (N,N'-diphenyl-p-phenylenediamine), 0.8 part of accelerator MBT (2-mercaptobenzothiazole), and 3.5 parts of sulfur.

A rubber compound W was prepared similarly to compound V except that a mixture of 1.25 parts of resorcinol and 1 part of trimeric methyleneaminoacetonitrile was added before the sulfur.

A rubber compound X was prepared by mixing 101.2 parts of butadiene-acrylonitrile copolymer rubber, 88 parts of carbon black, 3.6 parts of zinc oxide, 0.2 part of BLE, 30 parts of dibutyl sebacate, 0.4 part of zinc laurate, 1.5 parts of MBTS, and 1.5 parts of sulfur.

A rubber compound Y was prepared similarly to compound X except that 1.5 parts of resorcinol was added after the rubber and carbon black and the trimeric methyleneaminoacetonitrile was added before the MBTS and sulfur.

The adhesion of rubber compounds T, U, V and W to tire cords made of grey and solutioned rayon and nylon and the adhesion of rubber compounds X and Y to tire cords made of grey rayon and nylon was measured at 250° F. by the "H" adhesion test. The test pieces were vulcanized for 30 minutes at 307° F. The results are shown in the following table:

[250° F. "H" adhesion (lbs.)]

|  | T | U | V | W | X | Y |
|---|---|---|---|---|---|---|
| Grey Rayon | 2.3 | 4.9 | 2.4 | 6.6 | 1.3 | 4.4 |
| Grey Nylon | 3.0 | 3.8 | 2.6 | 6.2 | 2.3 | 8.3 |
| Solutioned Rayon | 12.1 | 16.0 | 11.6 | 13.3 | | |
| Solutioned Nylon | 13.1 | 14.5 | 13.9 | 15.4 | | |

*Example 5*

This example illustrates various other ways of applying the resorcinol and trimeric methyleneaminoacetonitrile.

The control compound Z was a rubber compound prepared by mixing 100 parts of natural rubber, 33 parts of carbon black, 10 parts of zinc oxide, 2 parts of stearic acid, 5 parts of pine tar softener, 1.5 parts of BLE, 0.4 part of SNS, and 3.5 parts of sulfur. The control compound Z was coated on grey rayon and nylon cords and "H" adhesion tests were run at 250° F.

Grey rayon and nylon cords were passed through an aqueous solution containing 4% of resorcinol and 3.2% of trimeric methyleneaminoacetonitrile, and dried. The thus treated cords were coated with compound Z. "H" adhesion tests were run at 250° F. This test is coded AA.

Grey rayon and nylon cords were passed through a 5% aqueous solution of trimeric methyleneaminoacetonitrile, and dried. The thus treated cords were coated with a rubber compound similar to compound Z except it contained 1% of resorcinol. "H" adhesion tests were run at 250° F. This test is coded BB.

Grey rayon and nylon cords were passed through a 5% aqueous solution of resorcinol, and dried. The thus treated cords were coated with a rubber compound similar to compound Z except it contained 1% of trimeric methyleneaminoacetonitrile. "H" adhesion tests were run at 250° F. This test is coded CC.

The test pieces were vulcanized for 30 minutes at 307° F. The results are shown in the following table:

[250° F. "H" adhesion (lbs.)]

|  | Z | AA | BB | CC |
|---|---|---|---|---|
| Grey Rayon | 3.3 | 4.0 | 6.8 | 3.5 |
| Grey Nylon | 3.8 | 7.7 | 3.1 | 8.8 |

*Example 6*

This example illustrates the use of other meta disubstituted benzenes with the trimeric methyleneaminoacetonitrile for improving the adhesion of textile material to rubber.

A rubber compound DD was prepared by mixing 100 parts of natural rubber, 20 parts of carbon black, 10 parts of zinc oxide, 2 parts of stearic acid, 0.5 part of SNS, 1 part of BLE, and 3.5 parts of sulfur.

A rubber compound EE was prepared similarly to compound DD except it contained 1.25 percent of m-aminophenol and 1 percent of trimeric methyleneaminoacetonitrile.

A rubber compound FF was prepared similarly to compound DD except it contained 1.7 percent of resorcinol monoacetate and 1 percent of trimeric methyleneaminoacetonitrile.

The adhesion of rubber compounds DD, EE and FF to tire cords made of grey rayon and nylon was measured at 250° F. by the "H" adhesion test. The test pieces were vulcanized for 30 minutes at 307° F. The results are shown in the following table:

[250° F. "H" adhesion (lbs.)]

|  | DD | EE | FF |
|---|---|---|---|
| Grey Rayon | 3.4 | 9.2 | 7.4 |
| Grey Nylon | 3.7 | 13.4 | 10.5 |

*Example 7*

This example illustrates the use of 1,5-naphthalenediol with the trimeric methyleneaminoacetonitrile for improving the adhesion of textile material to rubber.

A rubber compound GG was prepared by mixing 100 parts of natural rubber, 33 parts of carbon black, 10 parts of zinc oxide, 2 parts of stearic acid, 5 parts of pine tar softener, 1.5 parts of BLE, 0.4 part of SNS, and 3.5 parts of sulfur.

A rubber compound HH was prepared similarly to GG except that a mixture of 2 parts of 1,5-naphthalenediol and 1 part of trimeric methyleneaminoacetonitrile was added before the sulfur.

The adhesion of rubber compounds GG and HH to tire cords made of grey and solutioned rayon and nylon was measured at 250° F. by the "H" adhesion test. The test pieces were vulcanized for 30 minutes at 307° F. The results are shown in the following table:

[250° F. "H" adhesion (lbs.)]

|  | GG | HH |
|---|---|---|
| Grey Rayon | 2.9 | 10.7 |
| Grey Nylon | 4.6 | 8.9 |
| Solutioned Rayon | 12.3 | 18.8 |
| Solutioned Nylon | 20.4 | 21.7 |

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the method of adhering textile material to rubber by applying a vulcanizable rubber coating to a textile material and heating the assembly to vulcanize the rubber, the step which comprises incorporating in at least the portion of the assembly adjacent the interface of the textile material and rubber coating before vulcanization trimeric methyleneaminoacetonitrile and a compound selected from the group consisting of 1,5-naphthalenediol and meta disubstituted benzenes in which each of the substituents is selected from the group consisting of OH, NH$_2$ and OCOCH$_3$ radicals, said vulcanizable rubber coating comprising rubber selected from the group consisting of natural Hevea rubber and conjugated diolefine polymer synthetic rubbers which are polymers of material selected from the group consisting of butadiene-1,3-isoprene, 2,3-dimethyl butadiene-1,3, and mixtures thereof, and mixtures of such butadienes-1,3 with up to 50% of the mixtures of compounds which contain a CH$_2$=C< group and which are copolymerizable with butadienes-1,3.

2. In the method of adhering textile material to rubber by applying a vulcanizable rubber coating to a textile material and heating the assembly to vulcanize the rubber, the step which comprises incorporating in at least the portion of the assembly adjacent the interface of the textile material and rubber coating before vulcanization trimeric methyleneaminoacetonitrile and resorcinal, said vulcanizable rubber coating comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with up to 50% of the mixtures of compounds which contain a CH$_2$=C< group and which are copolymerizable with butadienes-1,3.

3. A method of adhering textile material to rubber which comprises applying a vulcanizable rubber composition comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with up to 50% of the mixtures of compounds which contain a CH$_2$=C< group and which are copolymerizable with butadienes-1,3, said rubber composition containing trimeric methyleneaminoacetonitrile and a compound selected from the group consisting of 1,5-naphthalenediol and meta disubstituted benzenes in which each substituent is selected from the group consisting of OH, NH$_2$ and OCOCH$_3$ radicals, to a textile material selected from the group consisting of cotton, rayon and nylon to coat the same, and heating the assembly to vulcanize the rubber and to firmly adhere the textile material to the vulcanized rubber composition.

4. A method of adhering tire cord fabric to a tire carcas stock which comprises calendering on tire cord fabric a vulcanizable rubber tire carcass stock containing trimeric methyleneaminoacetonitrile and resorcinol, and subsequently heating to vulcanize the rubber and to firmly adhere the tire cord fabric to the vulcanized tire carcass stock, said vulcanizable rubber tire carcass stock comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with up to 50% of the mixtures of compounds which contain a CH$_2$=C< group and which are copolymerizable with butadienes-1,3.

5. A method of adhering latex treated tire cord fabric to a tire carcass stock which comprises calendering on latex treated tire cord fabric a vulcanizable rubber tire carcass stock containing trimeric methyleneaminoacetonitrile and resorcinol, and subseqeuntly heating to vulcanize the rubber and to firmly adhere the tire cord fabric to the vulcanized tire carcass stock, said vulcanizable rubber tire carcass stock comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3 and mixtures thereof, and mixtures of such butadienes-1,3 with up to 50% of the mixtures of compounds which contain a CH$_2$=C< group and which are copolymerizable with butadienes-1,3.

6. A laminate of textile material and a vulcanized rubber composition in which an in situ formed resinous reaction product of trimeric methyleneaminoacetonitrile and a compound selected from the group consisting of 1,5-naphthalenediol and meta disubstituted benzenes in which each substituent is selected from the group consisting of OH, NH$_2$ and OCOCH$_3$ radicals is present adjacent the interface of the textile material and rubber composition, said vulcanized rubber composition comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with up to 50% of the mixtures of compounds which contain a CH$_2$=C< group and which are copolymerizable with butadienes-1,3.

7. A laminate of tire cord fabric and a vulcanized rubber tire carcass stock in which an in situ formed resinous reaction product of trimeric methyleneaminoacetonitrile and resorcinol is present adjacent the interface of the tire cord fabric and rubber tire carcass stock, said vulcanized rubber tire carcass stock comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with up to 50% of the mixtures of compounds which contain a CH$_2$=C< group and which are copolymerizable with butadienes-1,3.

8. A rubber composition for adhering strongly to textile material when vulcanized thereto comprising a vulcanizable rubber composition containing trimeric methyleneaminoacetonitrile and a compound selected from the group consisting of 1,5-naphthalenediol and meta disubstituted benzenes in which each substituent is selected from the group consisting of OH, NH$_2$ and OCOCH$_3$ radicals, said vulcanizable rubber coating comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with up to 50% of the mixtures of compounds which contain a CH$_2$=C< group and which are copolymerizable with butadienes-1,3.

9. A rubber composition for adhering strongly to textile material when vulcanized thereto comprising a vulcanizable rubber composition containing trimeric methyleneaminoacetonitrile and resorcinol, said vulcanizable rubber coating comprising rubber selected from the group consisting of natural Hevea rubber and conjugated diolefine polymer synthetic rubbers which are polymers of material selected from the group consisting of butadiene-1,3, isoprene, 2,3-dimethyl butadiene-1,3, and mixtures thereof, and mixtures of such butadienes-1,3 with up to 50% of the mixtures of compounds which contain a CH$_2$=C< group and which are copolymerizable with butadienes-1,3.

10. A textile fabric coated with an in situ formed resinous reaction product of trimeric methyleneaminoacetonitrile and a compound selected from the group consisting of 1,5-naphthalenediol and meta disubstituted benzenes in which each substituent is selected from the group consisting of OH, NH$_2$ and OCOCH$_3$ radicals.

11. A textile fabric coated with an in situ formed resinous reaction product of trimeric methyleneaminoacetonitrile and resorcinol.

12. A resinous heat reaction product of trimeric methyleneaminoacetonitrile and a compound selected from the group consisting of 1,5-naphthalenediol and meta di-substituted benzenes in which each substituent is selected from the group consisting of OH, NH$_2$ and OCOCH$_3$ radicals in the ratio of 1 mole of trimeric methyleneaminoacetonitrile to 1 to 4 moles of said other compound.

13. A resinous heat reaction product of trimeric methyleneaminoacetonitrile and resorcinol in the ratio of 1 mole of trimeric methyleneaminoacetonitrile to 1 to 4 moles of resorcinol.

No references cited.